United States Patent [19]

Roy et al.

[11] Patent Number: 4,644,397
[45] Date of Patent: Feb. 17, 1987

[54] METHOD OF PROCESSING A VIDEO IMAGE TO TRACK A BRIGHT SPOT AND TO PROTECT SAID TRACKING FROM INTERFERENCE FROM OTHER BRIGHT SPOTS

[75] Inventors: Jean-Claude Roy, Bagneux; Bernard Cerutti, Verriéres-le-Buisson, both of France

[73] Assignee: Societe de Fabrication d'Instruments de Mesure, Massy, France

[21] Appl. No.: 743,078

[22] Filed: Jun. 10, 1985

[30] Foreign Application Priority Data

Jun. 15, 1984 [FR] France .............................. 84 09389

[51] Int. Cl.[4] .............................................. H04N 7/18
[52] U.S. Cl. .................................... 358/126; 358/125
[58] Field of Search .................. 358/125, 126, 93, 107; 250/203 CT

[56] References Cited

U.S. PATENT DOCUMENTS

| | | | |
|---|---|---|---|
| 3,761,612 | 9/1973 | Alpers .................................. | 358/125 |
| 4,160,267 | 7/1979 | Eicher .................................. | 358/126 |
| 4,227,212 | 10/1980 | Woolfson et al. .................. | 358/126 |
| 4,319,269 | 3/1982 | Kajiura et al. .................... | 358/126 X |

FOREIGN PATENT DOCUMENTS 1604632 12/1981 United Kingdom ............... 358/126

Primary Examiner—Howard W. Britton
Assistant Examiner—Victor R. Kostak
Attorney, Agent, or Firm—Stevens, Davis, Miller & Mosher

[57] ABSTRACT

A method of processing a video image to track a bright spot and to protect said tracking from interference from other bright spots to protect said tracking from interference from other bright spots. In order to avoid a main spot (LP) from being lost by interference from decoy or secondary spots (LS) in a digitized video image (FM), the main spot is surrounded by a detection ring (CD) which is concentric with a processing window (FT) which fits closely round the main spot. When a decoy spot (LS) is detected in the detection ring, it likewise has a processing window (FT') and a detection ring (CD') assigned thereto in order to isolate it and to follow its trajectory. When the two spots come into contact, the tracking of one of said spots is interrupted. After the two spots move apart, a coherence test is performed to determine which of the spots is the main spot, and tracking continues, thereafter, with the main spot.

10 Claims, 7 Drawing Figures

METHOD OF PROCESSING A VIDEO IMAGE TO TRACK A BRIGHT SPOT AND TO PROTECT SAID TRACKING FROM INTERFERENCE FROM OTHER BRIGHT SPOTS

The present invention relates to a method of processing a video image to track a bright spot and to protect said tracking from interference from other bright spots.

This method is applicable to all angle measuring or firing-control systems in which an electronic image is formed of the field of aim by means of a suitable sensor which delivers a video signal (e.g. a television tube such as a vidicon tube, or a solid state device such as charge transfer device).

A projectile fired towards a target appears in the image. The image of the projectile on the screen is located and the guidance system automatically tracks said image: once the image has been "latched onto" information is continuously available concerning the angular direction of the projectile's path in order to generate angle-measuring signals for remote guidance towards the target.

BACKGROUND OF THE INVENTION

Such systems are described, for example, in French patent specifications Nos. 2 389 865 and 2 441 145 which additionally provides for simultaneous guidance systems controlling a plurality of projectiles fired at one or more targets which are tracked and displayed.

It is desirable to protect the tracking of the projectile(s) from interference due to countermeasures which an enemy may attempt to deflect the projectile from its trajectory. Since the projectile appears on the screen as a bright spot due to radiation emitted by a projectile tracer, countermeasures consist in ejecting decoys close to the direction taken by the projectile, said decoys emitting similar bright spots, e.g. by means of radiation produced by pyrotechnical means. The aim is to create confusion in the tracking system between the bright spot corresponding to the projectile and the bright spot corresponding to the decoy. Such confusion ends up with the tracking system latching onto the decoy and tracking the decoy rather than the bright spot corresponding to the projectile.

The probability of success when using such countermeasures depends on the number of decoys used, their brightness (since tracking systems generally tend to latch onto the brightest spot) and above all on the accuracy of firing. The probability of countermeasure success is very high if the trajectory of the decoy crosses the trajectory of the projectile as seen in the video image. In such a case, there comes a moment when the two bright spots are superposed, subsequently, when they separate the tracking system has no way of recognizing which of the two bright spots corresponds to the decoy and which corresponds to the projectile. If, as suggested above, the decoy is brighter than the projectile (and pyrotechnical means are readily available for creating very bright sources of radiation) the tracking system is very likely to latch onto the decoy. It then becomes impossible to follow the projectile unless the operator is able to intervene manually, and there is usually not enough time for such intervention to take place. The present invention seeks to reduce the risk of the tracking system being confused by such decoys, by enabling the system to continue tracking the bright spot which corresponds to the projectile in spite of other bright spots constituted by the decoys.

For reasons of clarity in explanation, the following description concerns protecting a single projectile from a single decoy. However, the method is naturally applicable to projecting a projectile from a plurality of decoys fired simultaneously by multiplying each of the decoy steps of the method by the number of decoys. Similarly, the system may track a plurality of projectiles simultaneously as in the systems described by the above-mentioned prior documents. Finally, bright spot tracking may be protected against interference from decoys when the tracked bright spot represents an object other than a projectile, for example when it represents a target which emits radiation either directly (an aircraft jet) or indirectly (using illumination from a laser).

SUMMARY OF THE INVENTION

To this end, the method according to the invention comprises the following steps:

defining a main processing window centered on the image of the bright spot and constituted by a portion of the video image which fully contains the envelope of the bright spot, the size and the position of said window being periodically redefined in such a manner as to match the movement and the change in size of the bright spot on the video image;

defining a main detection ring which is concentric with the main processing window and which completely surrounds said window, said main detection ring following the variations in size and position of the main processing window; and detecting the appearance of a decoy in the main detection ring and, for each decoy thus detected:

defining a secondary processing window centered on the image of the decoy and constituted by a portion of the video image which completely contains the enevelope of the decoy, the size and the position of said window being periodically redefined in such a manner as to match the movement and the change in size of the decoy on the video image;

defining a secondary detection ring concentric with the secondary processing window and completely surrounding said window, said secondary detection ring following the variations in size and position of the secondary processing window; and detecting the appearance of a decoy in the main detection ring and, for each decoy thus detected:

defining a secondary processing window centered on the image of the decoy and constituted by a portion of the video image which completely contains the envelope of the decoy, the size and the position of said window being periodically redefined in such a manner as to match the movement and the change in size of the decoy on the video image;

defining a secondary detection ring concentric with the secondary processing window and completely surrounding said window, said secondary detection ring following the variations in size and position of the secondary processing window; and detecting when the said bright spot and the decoy come into contact, and thereafter:

storing the ballistic parameters and the size of each of the two spots constituted by the said bright spot and the said detected decoy;

freezing one of said spots by interrupting the periodic redefinition of the corresponding processing window;

detecting in the detection ring of the non-frozen spot the appearance of the other spot, said detection indicating that said two spots are moving out of contact;

analyzing the ballistic parameters and the size of said other spot;

recognizing the nature of said spot, i.e. whether it constitutes the said bright spot or the said decoy; and continuing or restarting periodic redefinition of the main processing window.

Advantageously, prior to the step of recognizing the nature of the other spot, a coherence test is performed which consists in:

calculating the estimated ballistic parameters and size at said instant for said spot as a function of the initially stored ballistic parameters and size and of the time which has elapsed since said storage step;

comparing said estimated parameters with the detected parameters; and in the event of agreement, performing the step of recognizing the nature of the spot;

in the event of non-agreement, reiterating the coherence test at a later instant.

In other words, the processing window which is centered on the projectile is surrounded by a detection ring which moves with the processing window. When any bright spot appears in said ring, it is isolated and followed, and tracking is then "frozen" when the trajectories begin to cross, and continues to be frozen until the two images separate. In order to avoid confusing the decoy and the projectile at the end of the frozen stage, the point at which the decoy will arrive and the size of the decoy are predicted for the instant that the decoy and the projectile spots come apart; this coherence test is almost certain to be capable of determining the nature of each of the two spots (in practice, decoys are non-piloted objects which are merely ejected and their trajectories follow predictable ballistic paths, and in particular they do not change direction or zig-zag).

Preferably, in the event of repeated non-agreement during a period exceeding a limit value, the characteristic of being the said light spot is attributed to the non-frozen spot. This situation generally corresponds to the decoy going out during the "frozen" phase (since the decoys are pyrotechnical devices, their lifetime is limited). It is then desirable to remove the ambiguity so as to continue tracking normally.

Also preferably, simultaneously with continuing or restarting the periodic redefinition of the main processing window, the periodic redefinition of the secondary processing window is continued or restarted until the decoy has completely left the main detection ring. The decoy is thus followed even after the trajectories have crossed, thereby increasing the security of the method: each decoy is "monitored" until it has moved far enough away from the projectile.

Also preferably, the frozen spot is the smaller of the two spots. This situation corresponds to the commoner case in practice of decoys which emit high-intensity radiation that is greater in intensity than the radiation emitted by the projectile.

BRIEF DESCRIPTION OF THE DRAWINGS

An implementation of the invention is described, by way of example, with reference to the accompanying drawings, in which.

MORE DETAILED DESCRIPTION

Figure 1:
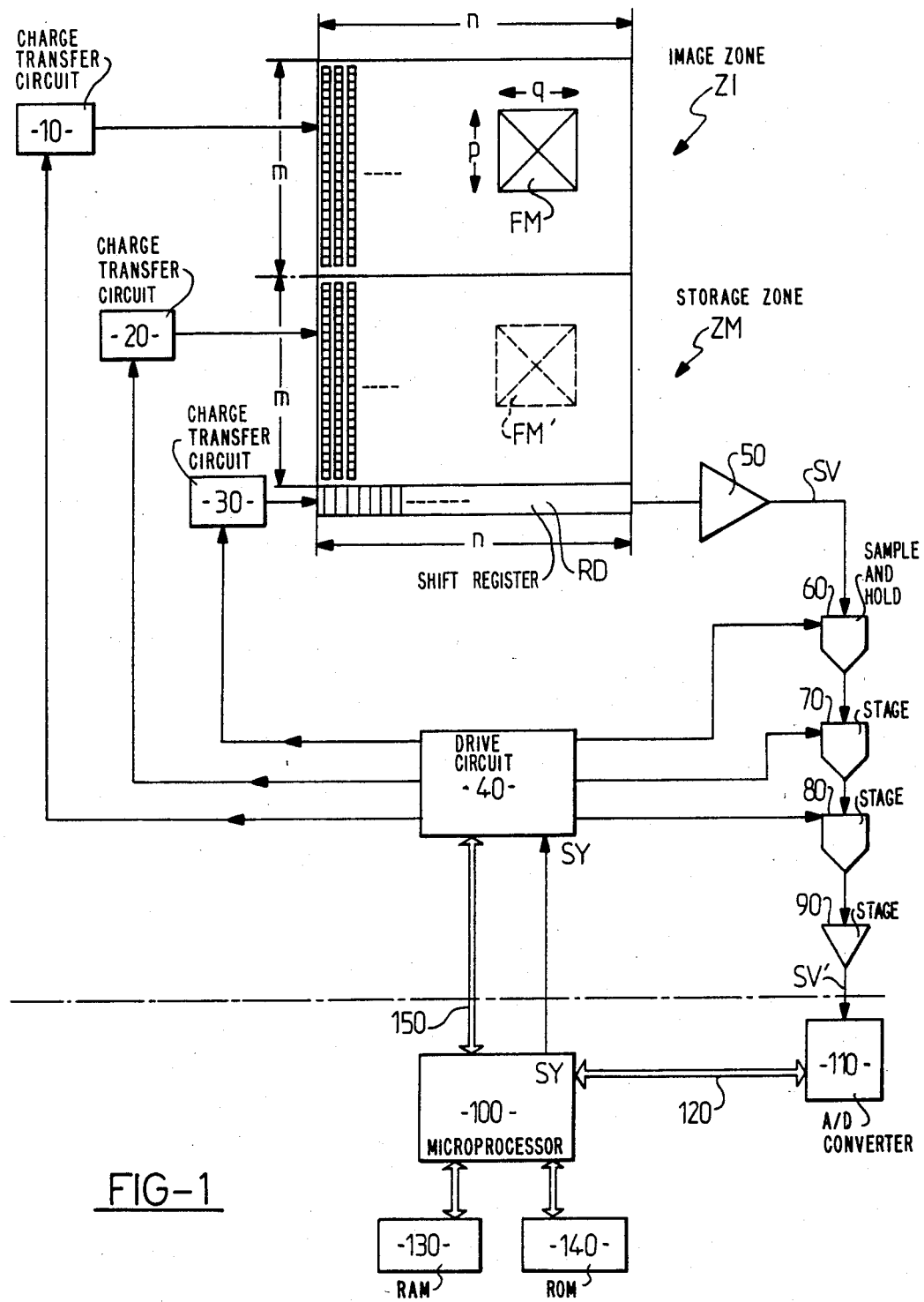
FIG. 1 is a diagrammatic view of an image receiver and of the circuits suitable for delivering, digitizing, and storing a video signal.

By way of example, the following description concerns an image formed by a charge transfer device of the type operating by frame transfer, such as the device shown in FIG. 1 in conjunction with associated circuitry.

In FIG. 1, the charge transfer device comprises, in conventional manner, an image zone ZI, a storage zone ZM, and a shift register RD. The image zone ZI is disposed in the focal plane of image-forming means, and transforms the light image of the field of view into a set of $\underline{m} \times \underline{n}$ light-representing charges. These charges are then transferred to the storage zone which is a matrix of $\underline{m} \times \underline{m}$ memory points, the contents of which is transferred line-by-line into the shift register RD and is read serially via an amplifier 50 to deliver a video signal SV. Circuits 10, 20 and 30 perform these various charge transfers under the control of a driver circuit 40 which is synchronized to a signal SY from a microprocessor 100.

The driver circuit 40 also controls a sample-and-hold circuit 60 which smoothes the video signal by eliminating the portions lying between the different pixels. A stage 70 then brings the reference or black-level points of each line to zero volts, and the following stage 80 brings those parts of the video signal which do not correspond to any image point at all to zero volts as well. Finally, a stage 90 performs level and impedance latching prior to transmitting the video signal SV' to image-analysis circuits. These circuits comprise a microprocessor 100 connected via a two-way series link 120 to an analog-to-digital converter 110 which converts the video signal SV' into digital form in real-time. The microprocessor exchanges data with a read/write random access memory (RAM) 130 and with a read only memory (ROM) 140, and also with the driver circuit 40 via a link 150. More precisely, the microprocessor defines a small window FM within the image zone and approximately centered on the target or projectile that it is being aimed at. The position of the window may be redefined during each image scan (with the reference FM' designating the position corresponding to the window in the memory zone ZM).

The digitized value corresponding to each pixel in said window are stored in the RAM 130. In the following description, the term "video image processing" designates processing the digital values corresponding to said window only.

The various steps of the invention are now described with reference to FIGS. 2 to 7 which represents the movements of various bright spots appearing within the stored window FM.

Generally speaking, spots of light, or simply "spots" appearing in the image are defined by an envelope or contour and by a center.

The envelopes are determined by a threshold level in the video signal. The threshold value is periodically updated as a function of the average value of the video signal over the entire image, taking account both of regions which are above the threshold and regions which are below the threshold. The spot is thus defined as being a set of pixels which contains points situated above the threshold.

The center of the spot is defined as being the center of contrast in the image. This center of contrast is determined by calculating the barycenter from the digitized values of the video signal of all the pixels in the corresponding spot. The center calculation is thus independent of the other spots which may appear in the memory window, except insofar as the appearance of other spots may modify the threshold value which defines the perimeter of the spot.

The arrival of the projectile in the image field rapidly increases the average level of the video signal and the number of points above the threshold. By way of precaution, a check is then performed that the center of contrast of the spot which has just arrived is indeed in a peripheral region of the field (if the contrary is true, the spot would necessarily be a decoy).

If the spot that has just appeared satisfies this condition, the memory window is initially positioned in the image zone so that the center of the window coincides with the above-determined center of contrast.

A processing window FT is then defined (FIG. 2) centered on the main spot LP, and fitting as tightly as possible thereabout (the size and position of the processing window FT are self-adapting as a function of the movement and of the variation in area of the main spot LP).

The processing window FT is then completely surrounded by a detection ring CD, e.g. a ring having four times the area of the processing window. The processing window and the detection ring are concentric and move together with the main spot LP.

During each calculation cycle, the contents of the detection ring is analyzed in order to detect the arrival of secondary spots LS. When such a spot is detected (FIG. 3) a secondary processing window FT' is assigned thereto together with a secondary detection ring CD'. The secondary window and ring are identical to the window and ring used with the main spot. This corresponds to the beginning of an "alarm" phase corresponding to the detection and observation of a secondary spot.

Figure 4:
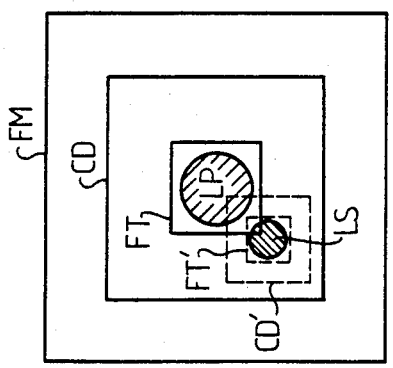
FIGS. 2 to 7 illustrate various steps in the process according to the invention.

The secondary spot is then tracked in the same manner as the primary spot until the contours of the respective spots come into contact (FIG. 4). If a plurality of secondary spots are being observed in the detection ring, they are all tracked until the first contact between the main spot and one of the secondary spots.

A "freeze" phase then begins. The areas of the two spots are examined and the smaller spot is no longer tracked.

Throughout this "freeze" phase in which the two spots are superposed (FIG. 5) only one spot is tracked (in particular the larger of the two spots, which in the present example happens to be the main spot).

The separation of two spots (FIG. 6) is detected by the appearance of a spot in the detection ring of the non-frozen spot.

A check is now performed to verify that the spot which has appeared in the detection ring is indeed a secondary spot (and if not the two tracking processes must be swapped over) and if the spot is indeed a secondary spot, a check is performed to verify that it is the same secondary spot as had been detected prior to the "freeze" phase.

In order to do this, a coherence test is performed on the size and position of the newly detected spot:

if this spot is the expected spot, main spot tracking continues (i.e. the main spot has been recognized or identified amongst the two new spots). The "freeze" phase is terminated;

if the spot is not the expected spot, it must be another secondary spot: the "freeze" phase continues and a new processing window and a new detection ring are assigned to the new spot (it should be observed that when there is a plurality of secondary spots, an equal plurality of "freeze" phases may be assigned thereto, which phases may overlap).

Figure 7:
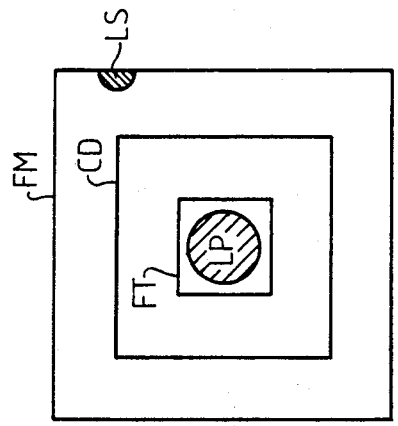
Figure 3:
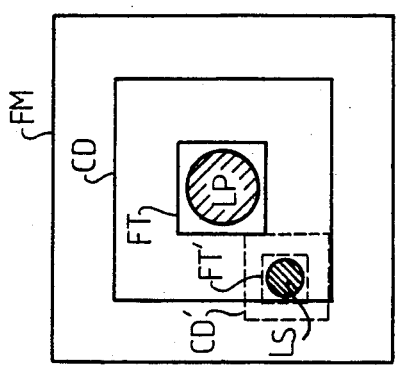
Figure 6:
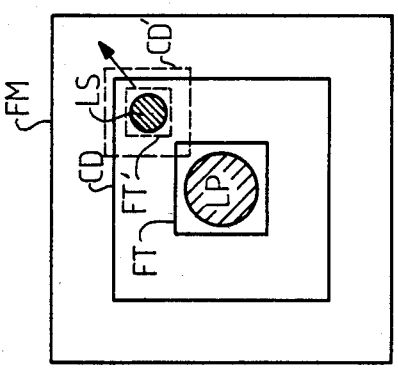
Figure 2:
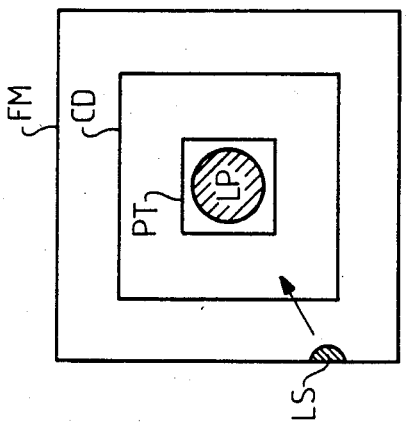
Figure 5:
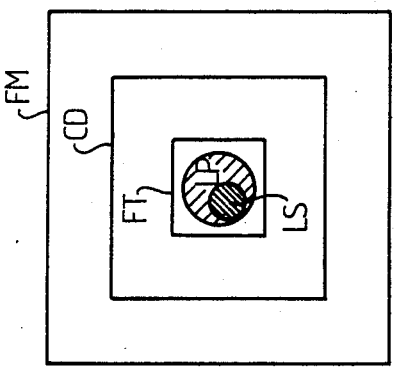

Once the "freeze" phase is over, the expected spot has been rediscovered in the detection ring and it is followed until it leaves the detection ring (FIG. 7). The "alarm" phase is now over, and the processing window FT' and the detection ring CD' attributed to the secondary spot in question are released in the memory.

We claim:

1. A method of processing a video image to track a bright spot and to protect said tracking from interference from other bright spots, wherein the method comprises the following steps:
    defining a main processing window centered on the image of the bright spot and constituted by a portion of the video image which fully contains the envelope of the bright spot, the size and the position of said window being periodically redefined in such a manner as to match the movement and the change in size of the bright spot on the video image;
    defining a main detection ring which is concentric with the main processing window and which completely surrounds said window, said main detection ring following the variations in size and position of the main processing window; and
    detecting the appearance of a decoy in the main detection ring and, for each decoy thus detected:
    defining a secondary processing window centered on the image of the decoy and constituted by a portion of the video image which completely contains the envelope of the decoy, the size and the position of said window being periodically redefined in such a manner as to match the movement and the change in size of the decoy on the video image;
    defining a secondary detection ring concentric with the secondary processing window and completely surrounding said window, said secondary detection ring following the variations in size and position of the secondary processing window; and
    detecting when the said bright spot and the decoy come into contact, and thereafter:
    storing the ballistic parameters and the size of each of the two spots constituted by the said bright spot and the said detected decoy;
    freezing one of said spots by interrupting the periodic redefinition of the corresponding processing window;
    detecting in the detection ring of the non-frozen spot the appearance of the other spot, said detection indicating that said two spots are moving out of contact;
    analyzing the ballistic parameters and the size of said other spot;
    recognizing the nature of said spot, i.e. whether it constitutes the said bright spot or the said decoy; and
    continuing or restarting periodic redefinition of the main processing window so as to track said bright spot.

2. A method according to claim 1, wherein prior to the step of recognizing the nature of said other spot, a coherence test is performed which consists in:

calculating the estimated ballistic parameters and size at said instant for said spot as a function of the initially stored ballistic parameters and size and of the time which has elapsed since said storage step;

comparing said estimated parameters with said detected and stored ballistic parameters; and in the event of agreement, performing the step of recognizing the nature of the spot;

in the event of non-agreement, reiterating the coherence test at a later instant.

3. A method according to claim 1, wherein, in the event of repeated non-agreement for a period which exceeds a limit value, the characteristics of being said bright spot is attributed to the non-frozen spot.

4. A method according to claim 1, wherein, simultaneously with said periodic redefinition of the main processing window being continued or restarted, periodic redefinition of the secondary processing window is continued or restarted until the decoy has completely left the main detection ring.

5. A method according to claim 1, wherein the frozen spot is the spot having the smaller surface area.

6. A method according to claim 1, wherein the ballistic parameters include instantaneous values of: position, direction, velocity, and modulus of velocity.

7. A method according to claim 1, wherein said video image is a digitized image and the envelopes of the said bright spot and of any decoys are defined relative to a threshold video signal level.

8. A method according to claim 7, wherein the threshold value is periodically updated as a function of the average values of the video signal for said video image as a whole including any regions which are above the threshold and any regions which are below the threshold.

9. A method according to claim 7, wherein the center of said bright spot or of a decoy is determined by calculating the barycenter from the digital values of the video signal.

10. A method according to claim 1, wherein the initial step of defining the main processing window is only performed if the said bright spot has appeared in a peripheral region of the video image.

* * * * *